(12) United States Patent
Sakakura

(10) Patent No.: US 8,716,376 B2
(45) Date of Patent: May 6, 2014

(54) RUBBER COMPOSITION AND HOSE USING THE SAME

(75) Inventor: Shinji Sakakura, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 138 days.

(21) Appl. No.: 11/656,530

(22) Filed: Jan. 23, 2007

(65) Prior Publication Data

US 2007/0173571 A1 Jul. 26, 2007

(30) Foreign Application Priority Data

Jan. 25, 2006 (JP) ................................ 2006-015885

(51) Int. Cl.
| | |
|---|---|
| *C08K 5/3492* | (2006.01) |
| *C08L 61/06* | (2006.01) |
| *C08L 9/02* | (2006.01) |
| *C08L 33/08* | (2006.01) |
| *C08L 33/10* | (2006.01) |

(52) U.S. Cl.
USPC ........... 524/100; 524/492; 525/132; 525/480; 525/502; 525/504

(58) Field of Classification Search
USPC ........... 525/113, 330, 331.8, 333.9, 191, 222, 525/227, 230, 232, 233, 238, 240, 480, 502, 525/504, 132; 524/493, 100, 492
See application file for complete search history.

(56) References Cited

U.S. PATENT DOCUMENTS

| | | | | |
|---|---|---|---|---|
| 5,314,955 A | * | 5/1994 | Halladay ........................ | 525/139 |
| 6,492,454 B1 | * | 12/2002 | Ozawa et al. .................. | 524/493 |
| 2003/0066603 A1 | * | 4/2003 | Halladay et al. .............. | 156/329 |
| 2008/0182939 A1 | | 7/2008 | Morikawa et al. | |

FOREIGN PATENT DOCUMENTS

| | | |
|---|---|---|
| CN | 1555395 A | 12/2004 |
| JP | 59-001548 | 1/1984 |
| JP | 10-087888 | 4/1998 |

OTHER PUBLICATIONS

Fink, Johannes K. Reactive Polymers Fundamentals and Applications—A Concise Guide to industrial Polymers Plastics Design Library (2005) pp. 241-253.*

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

The present invention provides a rubber composition capable of forming an inner tube and/or an outer cover having high adhesion to a brass-plated wire and having excellent heat resistance, and oil resistance in a hose using a brass-plated wire as a reinforcing layer. The rubber composition includes 100 parts by mass of a rubber component (A) that includes ethylene-(meth)acrylate copolymer rubber and/or hydrogenated acrylonitrile-diene copolymer rubber, 1 to 30 parts by mass of a phenol resin (B), 1 to 30 parts by mass of silica (C), 0.1 to 5 parts by mass of a triazine compound (D) represented by the following formula (I), and 1 to 15 parts by mass of an organic peroxide (E) (in the formula (I), R represents a mercapto group, alkoxy group, monoalkylamino group, dialkylamino group, monocycloalkylamino group, dicycloalkylamino group, or N-alkyl-N-arylamino group).

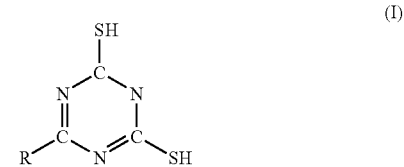

(I)

7 Claims, No Drawings

RUBBER COMPOSITION AND HOSE USING THE SAME

BACKGROUND OF THE INVENTION

1. Field of the Invention

The present invention relates to a rubber composition, and to a hose including the rubber composition and having a brass-plated wire as a reinforcing layer. More specifically, the present invention relates to a hose having high adhesion to a brass-plated wire and having excellent heat resistance, low-temperature resistance, and oil resistance.

2. Description of the Related Art

A high-pressure hose using a brass-plated wire as a reinforcing layer generally has an inner tube including acrylonitrile-butadiene copolymer rubber (NBR) and an outer cover including chloroprene rubber (CR) in the case where the hose is intended to be used at a temperature of 100° C. or lower. Meanwhile, in the case where the hose is intended to be used at a temperature of higher than 100° C., it generally has an inner tube including hydrogenated acrylonitrile-butadiene copolymer rubber (HNBR) and an outer cover including ethylene-propylene-diene copolymer rubber (EPT), chlorosulfonated polyethylene rubber (CSM), chlorinated polyethylene rubber (CPE), or the like.

However, EPT has poor oil resistance, so it is not suitable for a hose to be used in a hydraulic circuit. On the other hand, CSM and CPE each include chlorine in the rubbers, so a wire is easy to corrode when the rubbers are used at high temperature. In particular, in the case of CSM, lead oxide is effective for corrosion prevention (see JP 07-196866 A, Claims), but use of lead compounds tends to be restrained because of environmental problems, and it has been required to develop a rubber composition having heat resistance and oil resistance as an alternative to chlorine-containing rubbers.

Acrylic rubber and ethylene-(meth) acrylate copolymer rubber (AEM) have been proposed as alternatives to the above-mentioned chlorine rubbers, but the acrylic rubber which has a chlorine active group and is easy to adhere to a brass-plated wire has a problem of easily corroding the brass-plated wire as in the case of CSM or CPE and having poor low-temperature resistance. Meanwhile, AEM has relatively good low-temperature resistance, but has a problem of having low adhesion to a brass-plated wire.

To solve the above-mentioned problems, there has been proposed a hose including a rubber composition containing hydrogenated acrylonitrile-butadiene copolymer rubber, ethylene-acrylate copolymer rubber, an organic peroxide to be used for rubber crosslinking, a triazine compound as a vulcanizer, and a polymer having an epoxy group which is crosslikable by an organic peroxide (see JP 2001-241573A, Claims, and Example 1). The rubber composition containing the polymer having an epoxy group has excellent adhesion to a brass-plated wire, heat resistance, and the like, but it has problems of having high viscosity, resulting in poor workability in milling and extrusion.

SUMMARY OF THE INVENTION

An object of the present invention is to provide a rubber composition which forms an inner tube and/or an outer cover having high adhesion to a brass-plated wire and having excellent heat resistance, low-temperature resistance, and oil resistance in a hose using a brass-plated wire as a reinforcing layer.

The inventors of the present invention have made extensive studies to achieve the above-mentioned object, and as a result they have found that a rubber composition including ethylene-(meth)acrylate copolymer rubber, hydrogenated acrylonitrile-diene copolymer rubber, or a rubber component of a mixture thereof, a phenol resin, silica, a triazine compound having a specific structure, and an organic peroxide, and if necessary, a co-crosslinking agent is effective to achieve the object. The present invention has been completed based on those findings.

That is, the present invention provides: a rubber composition including 100 parts by mass of a rubber component (A) that includes ethylene-(meth)acrylate copolymer rubber and/or hydrogenated acrylonitrile-diene copolymer rubber, 1 to 30 parts by mass of a phenol resin (B), 1 to 30 parts by mass of silica (C), 0.1 to 5 parts by mass of a triazine compound (D) represented by the following formula (I), 1 to 15 parts by mass of an organic peroxide (E), and 5 to 20 parts by mass of a plasticizer (F); and a hose having at least an inner tube, an outer cover, and a brass-plated wire as a reinforcing layer, in which at least the outer cover includes the above-mentioned rubber composition.

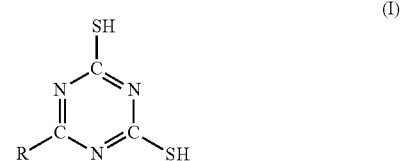

(I)

In the formula (I), R represents a mercapto group, alkoxy group, monoalkylamino group, dialkylamino group, monocycloalkylamino group, dicycloalkylamino group, or N-alkyl-N-arylamino group.

According to the present invention, there can be obtained a rubber composition for forming an inner tube and an outer cover of a hose and a hose having high adhesion to a reinforcing layer composed of a brass-plated wire and having excellent heat resistance, low-temperature resistance, and oil resistance.

DETAILED DESCRIPTION OF THE PREFERRED EMBODIMENT

A rubber composition of the present invention includes as a rubber component (A) ethylene-(meth)acrylate copolymer rubber, hydrogenated acrylonitrile-diene copolymer rubber, or a mixture thereof.

Examples of a (meth)acrylate which forms the ethylene-(meth)acrylate copolymer rubber (hereinafter, referred to as "AEM") include methyl (meth)acrylate, ethyl (meth)acrylate, butyl (meth)acrylate, t-butyl (meth)acrylate, and 2-ethylhexyl (meth)acrylate. Note that, AEM is a copolymer of ethylene and one of the acrylates. Moreover, a crosslinking monomer may be added as the third copolymerization component. In the preset invention, ethylene-methyl (meth)acrylate copolymer rubber is particularly preferable in terms of low-temperature resistance.

Note that, the term "(meth)acrylate" as used herein refers to an acrylate or a methacrylate.

Meanwhile, the acrylonitrile-diene copolymer rubber is a polymer having a structure represented by the following formula (II) and consists of a saturated methylene chain, a chain having a nitrile group, and a carbon-carbon double bond moiety.

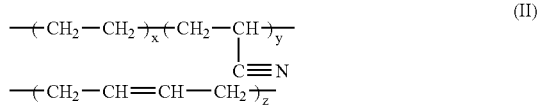

Note that, the respective chains in the above-mentioned polymer may be block chains or random chains.

A polymer represented by the formula (II) preferably includes a chain having a nitrile group in an amount within the range of 10 to 45% by mass. In the case where the content is 10% by mass or more, the polymer has high oil resistance, while in the case where the content is 45% by mass or less, the polymer has excellent low-temperature resistance. Therefore, the content is more preferably within the range of 25 to 40% by mass.

In the present invention, the above-mentioned acrylonitrile-diene copolymer rubber is hydrogenated before use, and the hydrogenation ratio is preferably 95% or more. In the case where the hydrogenation ratio is 95% or more, the rubber composition has good heat resistance. Therefore, the hydrogenation ratio is more preferably 98% or more, and particularly preferably 100%.

Specific examples of the acrylonitrile-diene copolymer rubber include hydrogenated products of butadiene-acrylonitrile copolymer rubber, isoprene-acrylonitrile copolymer rubber, butadiene-isoprene-acrylonitrile copolymer rubber, butadiene-methylacrylate-acrylonitrile copolymer rubber, butadiene-acrylic acid-acrylonitrile copolymer rubber, butadiene-ethylene-acrylonitrile copolymer rubber, butyl acrylate-ethoxyethyl acrylate-vinyl chloroacetate-acrylonitrile copolymer rubber, and butylacrylate-ethoxyethyl acrylate-vinylnorbornene-acrylonitrile copolymer rubber. Among them, the butadiene-acrylonitrile copolymer rubber is preferable. In the present invention, the most preferable is a hydrogenated product of the butadiene-acrylonitrile copolymer rubber (hereinafter, sometimes referred to as "HNBR").

The rubber component (A) of the present invention includes the above-mentioned AEM, hydrogenated acrylonitrile-diene copolymer rubber, or a mixture thereof, and among them, a mixture of AEM and hydrogenated acrylonitrile-diene copolymer rubber is preferable. Use of the mixture can promote crosslinking, resulting in improvement of the elasticity modulus and tensile strength of the rubber.

The mixing ratio of AEM and hydrogenated acrylonitrile-diene copolymer rubber is preferably within the range of 1:9 to 9:1. If the ratio is within the range, the mixture can attain sufficient elasticity modulus and tensile strength.

The rubber composition of the present invention is characterized by being mixed with a phenol resin (B). The phenol resin is an oligomer or a polymer obtained by condensation between phenols and aldehydes. Examples of the phenols include: lower alkylphenols such as phenol, o-, m-, and p-cresols, xylenol, and tert-butylphenol; higher phenols such as nonylphenol, cashew oil, and lignin; and dihydric phenols such as resorcin and catechol. As the aldehydes, formaldehyde is primarily used.

Examples of main phenol resins include a phenol-formaldehyde resin, a resorcin-formaldehyde resin, and a cresol resin. Among them, the phenol-formaldehyde resin is particularly preferable because it is easily mixed in rubber and improves the elasticity modulus and tensile strength of the rubber.

Further, any one of a 100% phenol resin, a natural resin modified phenol resin, an oil modified phenol resin, and the like can be used as the phenol resin.

Meanwhile, a novolac resin (two-step resin to be cured with a curing agent) may be used as the phenol resin. Examples of the curing agent include hexamethylenetetramine and hexamethoxymethylmelamine. A combination of them may be freely selected, and a plurality of resins and curing agents for the resins may be selected. Meanwhile, a resin containing a curing agent may be used.

A phenol resin (B) is mixed into a rubber composition of the present invention within the range of 1 to 30 parts by mass with respect to 100 parts by mass of a rubber component (A). If the blending amount of the phenol resin is less than 1 part by mass, the rubber composition has insufficient adhesion to a brass-plated wire, while if the blending amount is more than 30 parts by mass, the rubber composition becomes too hard, resulting in poor flexibility. Therefore, the blending amount of the phenol resin (B) is more preferably within the range of 2 to 20 parts by mass.

A rubber composition of the present invention is characterized by being mixed with silica (C). Silica ($SiO_2$) to be used in the present invention is not particularly limited as long as it is generally used in a rubber composition, and it may be crystalline or amorphous silica. Examples of commercially available silica include NIPSEAL AQ manufactured by Nippon Silica K. K.

Silica (C) is mixed into a rubber composition of the present invention within the range of 1 to 30 parts by mass with respect to 100 parts by mass of a rubber component (A). If the blending amount is less than 1 part by mass, the rubber composition has insufficient adhesion to a brass-plated wire, while if the blending amount is more than 30 parts by mass, the rubber composition has too high viscosity before vulcanization, resulting in poor workability in extrusion or the like. Therefore, the blending amount of silica (C) is more preferably within the range of 2 to 20 parts by mass.

A rubber composition of the present invention is characterized by being mixed with a triazine compound (D) represented by the following formula (I).

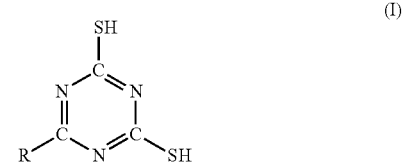

In the formula (I), R represents a mercapto group, alkoxy group, monoalkylamino group, dialkylamino group, monocycloalkylamino group, dicycloalkylamino group, or N-alkyl-N-arylamino group. Among them, the mercapto group is particularly preferable.

Examples of commercially available triazine compounds include "ZISNET-F" manufactured by Sankyo Kasei Co., Ltd. and "TDCA" manufactured by Ouchi Shinko Chemical Industrial Co., Ltd.

A triazine compound (D) is mixed into a rubber composition of the present invention within the range of 0.1 to 5 parts by mass with respect to 100 parts by mass of a rubber component (A). If the blending amount is less than 0.1 parts by mass, the rubber composition has insufficient adhesion to a brass-plated wire, while if the blending amount is more than 5 parts by mass, a vulcanization reaction is inhibited. Therefore, the blending amount of a triazine compound (D) is more preferably within the range of 0.5 to 2 parts by mass.

A rubber composition of the present invention is characterized by being mixed with an organic peroxide (E). The organic peroxide serves as a vulcanizer, and it may be any organic peroxide as long as it does not cause excess development of a crosslinking reaction at a temperature during processing. Examples thereof include ketone peroxide, peroxyketal, hydroperoxide, dialkyl peroxide, diacyl peroxide, peroxydicarbonate, and peroxyester. Specific examples thereof include dicumyl peroxide, 1,3-bis-(t-butyl-peroxyisopropyl)benzene, and n-butyl 4,4-di-t-butylperoxyvalerate. Meanwhile, examples of commercially available organic peroxides include "Perkadox 14/40" manufactured by Kayaku Nouri Co., Ltd. and "Peroxymon F40" manufactured by NOF Corporation.

An organic peroxide (E) is mixed into a rubber composition of the present invention within the range of 1 to 15 parts by mass with respect to 100 parts by mass of a rubber component (A). If the blending amount is less than 1 part by mass, crosslinking is insufficiently achieved due to few crosslinking points, while if the blending amount is more than 15 parts by mass, a residue of the organic peroxide sometimes has adverse effects on heat aging. Therefore, the blending amount of an organic peroxide (E) is more preferably within the range of 2 to 10 parts by mass.

Examples of a plasticizer (F) to be used in the present invention include polyether ester, phthalate, and adipate. These plasticizers may be used alone or in combination of two or more. The blending amount thereof is within the range of 5 to 20 parts by mass with respect to 100 parts by mass of a rubber component (A). If the blending amount is 5 parts by mass or more, low-temperature resistance is improved. On the other hand, if the blending amount is less than 20 parts by mass, there are advantages of avoiding lowering of the elasticity modulus and tensile strength of the rubber and avoiding lowering of adhesion. Therefore, the blending amount of the plasticizer is more preferably within the range of 7.5 to 15 parts by mass.

A rubber composition of the present invention is preferably mixed with a co-crosslinking agent. The co-crosslinking agent is used to enhance the crosslinking efficiency of the organic peroxide (E). Specific examples thereof include triallyl cyanurate (TAC), triallyl isocyanurate (TAIC), triacryl formal (TAF), and diallyl phthalate (DAP). Among them, TAIC and TAF are particularly preferable in terms of crosslinking efficiency.

Those co-crosslinking agents may be used alone or in combination of two or more, and the blending amount thereof is preferably within the range of 1 to 10 parts by mass with respect to 100 parts by mass of a rubber component (A). If the blending amount is 1 part by mass or more, crosslinking is sufficiently achieved, while if the blending amount is 10 parts by mass or less, a residue of a co-crosslinking agent has no adverse effects on heat aging. Therefore, the blending amount of a co-crosslinking agent is more preferably within the range of 1.5 to 5 parts by mass.

A rubber composition of the present invention may be added with another rubber component in addition to the above-mentioned rubber component (A) as long as the effect of the present invention is not impaired. Moreover, the rubber composition may be mixed with an appropriate amount of a generally used antioxidant, filler, reinforcer, softener, or other compounding ingredients, if necessary.

The antioxidant is not particularly limited as long as it is a heat resistant or weather resistant antioxidant. Examples thereof include: naphthylamine antioxidants such as phenyl-α-naphthylamine; diphenylamine antioxidants such as octyldiphenylamine; styrenated phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as a polymerized product of 2,2,4-trimethyl-1,2-dihydroxyquinoline; and phenol antioxidants such as 2,6-di-t-butyl-4-methylphenol, styrenated phenol, and tetrakis-[methylene-3-(3',5'-di-t-butyl-4'-hydroxyphenyl)propionate]methane.

Those antioxidants may be used alone or in combination of two or more. The blending amount is preferably within the range of 0.5 to 5 parts by mass with respect to 100 parts by mass of a rubber component (A). If the blending amount is 0.5 parts by mass or more, aging is sufficiently prevented, while if the blending amount is 5 parts by mass or less, crosslinking is not inhibited, which is desirable. Therefore, the blending amount of an antioxidant is more preferably within the range of 1 to 3 parts by mass.

Examples of the filler include carbon black, calcium carbonate, talc, clay, barium sulfate, and titanium oxide.

The carbon black to be used in the present invention may be one generally used in the rubber industry. Examples thereof include channel black, furnace black, acetylene black, and thermal black, which are produced by different methods, and all of them can be used. Meanwhile, various grades of carbon blacks such as SAF, HAF, ISAF, FEF, and GPF may be used alone or as a mixture.

The blending amount of the carbon black is preferably within the range of 50 to 100 parts by mass with respect to 100 parts by mass of a rubber component (A).

A rubber composition of the present invention has excellent oil resistance, heat resistance, and low-temperature resistance, and has high adhesion to a brass-plated wire. Therefore, a rubber composition of the present invention can be brought into close contact with a brass-plated wire, followed by vulcanization, to thereby produce a composite of the rubber and brass-plated wire. The composite may be used for applications such as hose, belt, roll, and tire, and it is particularly suitable for a high-pressure hose. Hereinafter, a hose using the above-mentioned rubber composition will be described in detail.

A hose of the present invention has an inner tube, an outer cover, and a brass-plated wire as a reinforcing layer, in which at least the outer cover uses the above-mentioned rubber composition of the present invention, and is obtained by vulcanization to produce a composite of the wire and rubber composition. Note that, the vulcanization condition is generally within the range of 140 to 170° C., while the vulcanization method is general steam vulcanization or the like. On the other hand, the inner tube may use the above-mentioned rubber composition of the present invention or may use acrylic rubber, acrylonitrile-butadiene copolymer rubber (NBR), etc., which are generally used as an inner tube of a high-pressure hose and have oil-resistance.

A hose having inner tube and outer cover each including a rubber composition of the present invention is produced as follows. First, an unvulcanized rubber composition is extruded using an extruder on a mandrel coated with a mold-releasing agent, to thereby form an inner tube. Next, brass-plated wires are arranged in a net-like fashion on the inner tube, and then the unvulcanized rubber composition is extruded using an extruder, to thereby form an outer cover. Thereafter, a vulcanization treatment is performed, to thereby obtain a hose of the present invention.

The thicknesses of the inner tube and outer cover of a hose of the present invention are not particularly limited, but are preferably within the range of 0.5 to 5 mm.

A reinforcing layer that is used in the present invention and is composed of a brass-plated wire is a brass-plated steel product, and the diameter of the wire is appropriately selected depending on the pressure on a high-pressure hose. A net structure is not particularly limited, and includes a blade structure of woven wires and the like.

EXAMPLES

Hereinafter, the present invention will be described in more detail by way of examples, but it is not limited to the examples.

(Evaluation Method)

(1). Adhesion; rubber compositions prepared in Examples and Comparative Examples were used to prepare two sheets each having a thickness of 5 mm and a width of 10 mm. The two sheets were skewered with a brass-plated wire having a length of 50 mm (diameter: 0.33 mm) and were placed in a mold, followed by pressure vulcanization at 165° C. for 60 minutes. After the vulcanization, the sheets were allowed to stand for 24 hours, and the skewered brass-plated wire was pull out at a rate of 50 mm/min to evaluate the sheets based on the pull-out forces.

(2) Thermal aging resistance; rubber compositions prepared in Examples and Comparative Examples were vulcanized at 165° C. for 60 minutes, to thereby obtain sheets each having a thickness of 2 mm. The sheets were subjected to a heat aging treatment at 150° C. for 72 hours in accordance with the method of JIS K 6257, "Aging test method for vulcanized rubber", the item (4) "Air heat aging test (normal oven method)", and elongation ratios after aging were determined. The sheets were evaluated based on the change rates of elongation ratios after aging with respect to elongation ratios before aging.

(3) Low-temperature resistance; rubber compositions prepared in Examples and Comparative Examples were vulcanized at 165° C. for 60 minutes, to thereby obtain sheets each having a thickness of 2 mm, and the sheets were cut in strips to prepare samples each having a width of 10 mm and a length of 150 mm. The strip sheets were stored in a cryostat where the temperature was controlled at −40° C. for 1 hour or more, and then they were taken out of the cryostat and immediately folded at a 90-degree angle. The sheets were evaluated on the basis of the following criteria.

○; the sheet was not broken or had no crack
×; the sheet was broken or had a crack Examples 1 to 4 and Comparative Examples 1 to 12

Rubber compositions having the mix proportions shown in Table 1 were obtained. The rubber compositions were each evaluated by the above-mentioned methods. The results are shown in Table 1.

TABLE 1

| Rubber compositions | | Example | | | | Comparative Example | | | | | | | | | | | |
|---|---|---|---|---|---|---|---|---|---|---|---|---|---|---|---|---|---|
| (parts by mass) | | 1 | 2 | 3 | 4 | 1 | 2 | 3 | 4 | 5 | 6 | 7 | 8 | 9 | 10 | 11 | 12 |
| Component (A) | AEM*1 | 100 | — | 70 | 30 | 100 | 100 | 100 | — | — | — | 70 | 30 | 100 | 100 | — | — |
| | HNBR*2 | — | 100 | 30 | 70 | — | — | — | 100 | 100 | 100 | — | — | — | — | 100 | 100 |
| Component (B) | Phenol resin*3 | 5 | 5 | 5 | 5 | — | — | 5 | — | — | 5 | — | — | 5 | 5 | 5 | 5 |
| Component (C) | Silica*4 | 10 | 10 | 10 | 10 | — | 10 | — | — | 10 | — | — | — | 10 | 10 | 10 | 10 |
| Component (D) | Triazine compound*5 | 1 | 1 | 1 | 1 | 1 | 1 | 1 | 1 | 1 | 1 | 1 | 1 | 1 | 1 | 1 | 1 |
| Component (E) | Organic peroxide*6 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Other components | Co-crosslinking agent TAIC*7 | 2 | 2 | 2 | 2 | 2 | 2 | 2 | 2 | 2 | 2 | 2 | 2 | 2 | 2 | 2 | 2 |
| | Co-crosslinking agent TAF*8 | 1 | 1 | 1 | 1 | 1 | 1 | 1 | 1 | 1 | 1 | 1 | 1 | 1 | 1 | 1 | 1 |
| | FEF carbon black*9 | 70 | 70 | 70 | 70 | 70 | 70 | 70 | 70 | 70 | 70 | 70 | 70 | 70 | 70 | 70 | 70 |
| | Plasticizer*10 | 10 | 10 | 10 | 10 | 10 | 10 | 10 | 10 | 10 | 10 | 10 | 10 | — | 30 | — | 30 |
| | Antioxidant*11 | 2 | 2 | 2 | 2 | 2 | 2 | 2 | 2 | 2 | 2 | 2 | 2 | 2 | 2 | 2 | 2 |
| | Steari cacid*12 | 2 | 2 | 2 | 2 | 2 | 2 | 2 | 2 | 2 | 2 | 2 | 2 | 2 | 2 | 2 | 2 |
| | Zinc white*13 | 2 | 2 | 2 | 2 | 2 | 2 | 2 | 2 | 2 | 2 | 2 | 2 | 2 | 2 | 2 | 2 |
| Evaluation results | Adhesion (pull-out force; N/10 mm) | 110 | 124 | 113 | 115 | 35 | 67 | 56 | 25 | 61 | 69 | 34 | 30 | 115 | 87 | 128 | 82 |
| | Thermal aging resistance (%) | 30 | 48 | 38 | 45 | 25 | 28 | 30 | 40 | 38 | 42 | 35 | 40 | 30 | 48 | 30 | 48 |
| | Low-temperature resistance | ○ | ○ | ○ | ○ | ○ | ○ | ○ | ○ | ○ | ○ | ○ | ○ | X | ○ | X | ○ |

*1AEM; ethylene-methyl acrylate copolymer rubber ("Vamac DP" manufactured by Du Pont Kabushiki Kaisha)
*2HNBR; hydrogenated acrylonitrile-butadiene copolymer rubber ("Therban A3406" manufactured by Bayer)
*3Phenol resin; "Sumilite Resin PR12687" manufactured by SUMITOMO BAKELITE Co., Ltd.
*4Silica; "NIPSEAL AQ" manufactured by Tosoh Silica Corporation
*5Triazine compound; "ZISNET F" manufactured by Sankyo Kasei Co., Ltd. (In chemical formula (I), R is a mercapto group)
*6Organic peroxide; "Peroxymon F40" manufactured by NOF Corporation
*7Co-crosslinking agent TAIC; manufactured by Nippon Kasei Chemical Co., Ltd.
*8Co-crosslinking agent TAF; manufactured by Kawaguchi Chemical Industry Co., Ltd.
*9FEF Carbon Black; "SEAST F" manufactured by Tokai Carbon Co., Ltd.
*10Plasticizer; "Adekacizer RS735" manufactured by Adeka Corporation
*11Antioxidant; "NOCRAC CD" manufactured by Ouchi Shinko Chemical Industrial Co., Ltd.
*12Stearic acid; "Lunack RA" manufactured by Kao Corporation
*13Zinc White; zinc oxide manufactured by Kyushu-Hakusui Corporation.

All the rubber compositions in Examples had pull-out forces of 100 N/10 mm or more and had good adhesion to brass-plated wires. Meanwhile, for the thermal aging resistance, the change rates of elongation ratios were 50% or less, so the rubber compositions were found to have good heat resistance and good low-temperature resistance.

On the other hand, the rubber compositions in Comparative Examples which were not mixed with silica or phenol resin had good thermal aging resistance, but they had pull-out forces of 100 N/10 mm or less and had poor adhesion to brass-plated wires. Meanwhile, the rubber compositions in Comparative Examples 9 and 11 which were not mixed with a plasticizer were found to have poor low-temperature resistance, while the rubber compositions in Comparative Examples 10 and 12 which were mixed with a large amount of the plasticizer were found to have poor adhesion to brass-plated wires.

INDUSTRIAL APPLICABILITY

The rubber compositions of the present invention have high adhesion to a brass-plated wire and have excellent thermal aging resistance. Therefore, the rubber compositions of the present invention are suitably used in a high-pressure hose having a reinforcing layer composed of a brass-plated wire, and use of the rubber compositions of the present invention as an inner tube or outer cover can provide a hose including a rubber composition having high adhesion to a reinforcing layer composed of a brass-plated wire and having excellent heat resistance and low-temperature resistance.

What is claimed is:

1. A rubber composition, comprising 100 parts by mass of a rubber component (A) that includes at least one of ethylene-(meth)acrylate copolymer rubber and hydrogenated acrylonitrile-diene copolymer rubber, 1 to 30 parts by mass of a phenol resin (B), 1 to 30 parts by mass of silica (C), 0.1 to 5 parts by mass of a triazine compound (D) represented by the following formula (I), 1 to 15 parts by mass of an organic peroxide (E), 5 to 20 parts by mass of a plasticizer (F), and triallyl isocyanurate and triacryl formal as co-crosslinking agents:

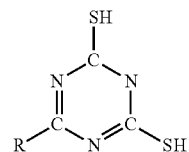

wherein R represents a mercapto group, alkoxy group, monoalkylamino group, dialkylamino group, monocycloalkylamino group, dicycloalkylamino group, or N-alkyl-N-arylamino group.

2. A rubber composition according to claim 1, wherein the rubber composition (A) is a mixture of ethylene-(meth)acrylate copolymer rubber and hydrogenated acrylonitrile-diene copolymer rubber, and the mixing ratio thereof falls within the range of 1:9 to 9:1.

3. A rubber composition according to claim 1, wherein the amount of the phenol resin (B) is 2 to 20 parts by mass.

4. A hose, comprising at least an outer cover, an inner tube, and a brass-plated pressure-proof reinforced steel wire rod, wherein the outer cover comprises the rubber composition according to claim 1.

5. A hose, comprising at least an outer cover, an inner tube, and a brass-plated pressure-proof reinforced steel wire rod, wherein both of the outer cover and the inner tube comprise the rubber composition according to claim 1.

6. A rubber composition according to claim 1, wherein the phenol resin (B) is selected from the group consisting of a phenol-formaldehyde resin, a resorcin-formaldehyde resin and a cresol resin.

7. A rubber composition according to claim 1, wherein the rubber component (A) includes hydrogenated acrylonitrile-diene copolymer rubber having a hydrogenation ratio of 100%.

* * * * *